April 3, 1934.  E. L. PATTEN  1,953,256

ARTICLE ASSEMBLING CONVEYER

Filed Dec. 22, 1932  4 Sheets-Sheet 1

INVENTOR
ERNEST L. PATTEN
BY
ATTORNEY

April 3, 1934.  E. L. PATTEN  1,953,256
ARTICLE ASSEMBLING CONVEYER
Filed Dec. 22, 1932  4 Sheets-Sheet 2

INVENTOR
ERNEST L. PATTEN
BY
ATTORNEY

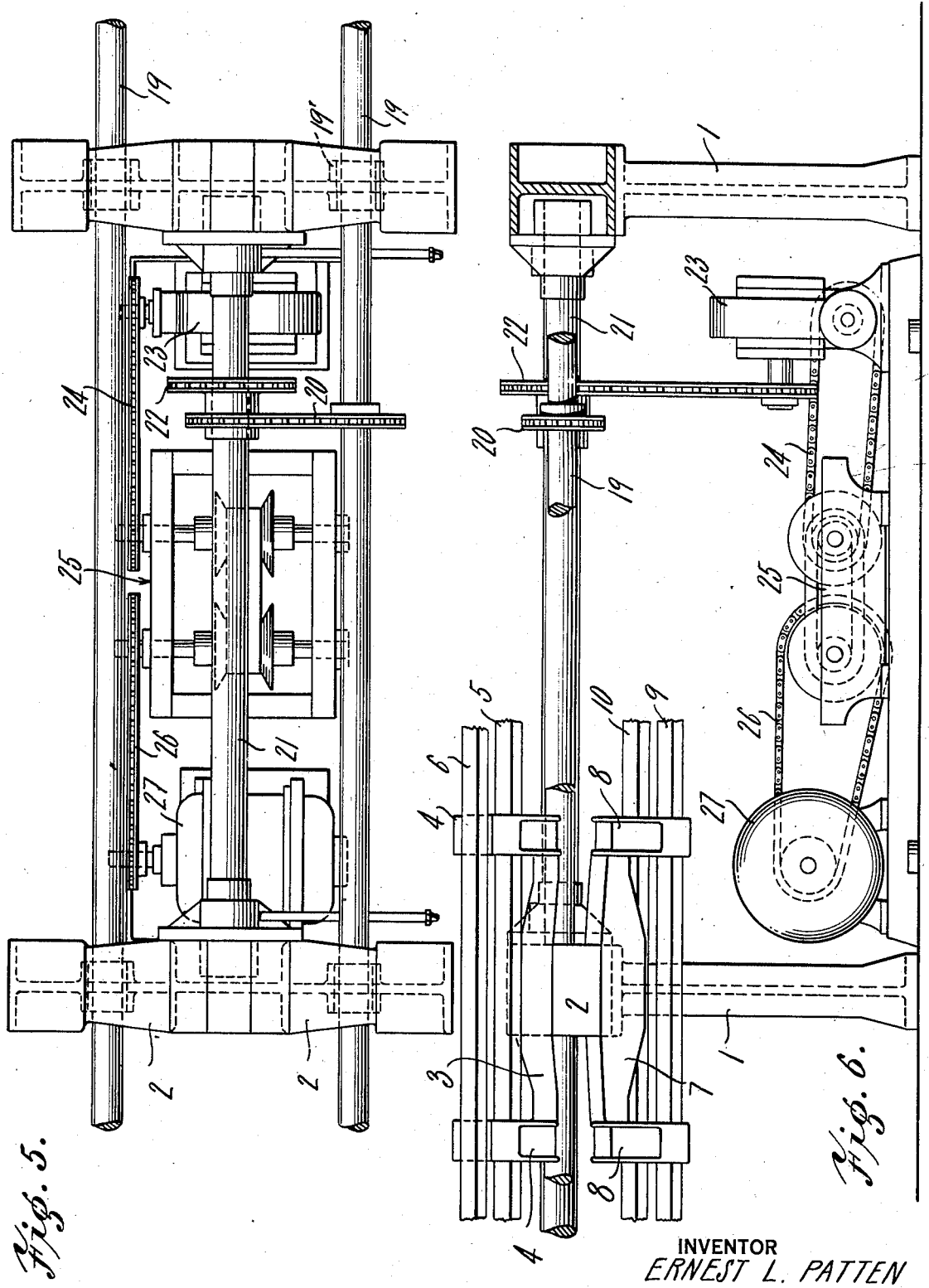

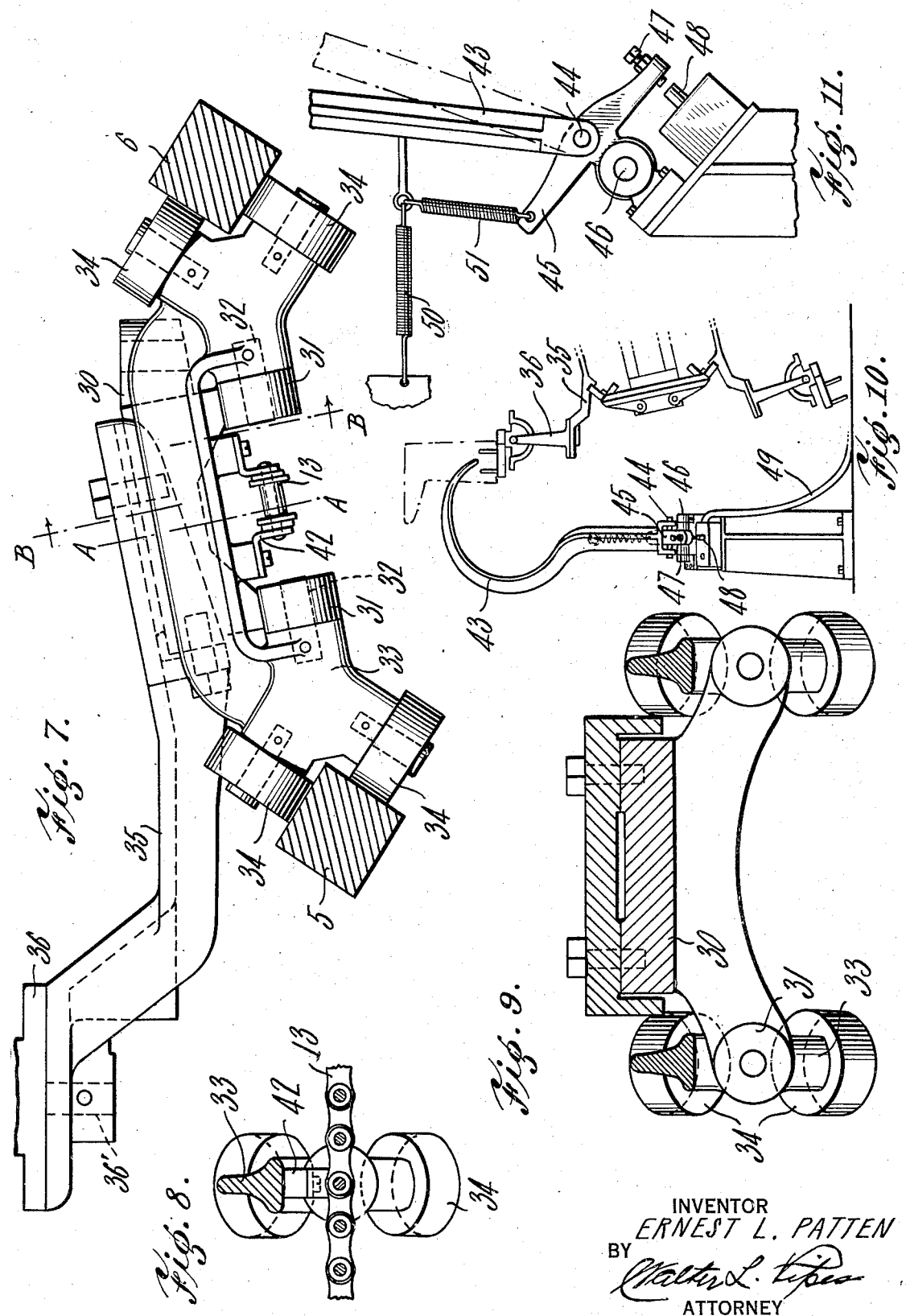

Patented Apr. 3, 1934

1,953,256

UNITED STATES PATENT OFFICE 1,953,256

ARTICLE ASSEMBLING CONVEYER

Ernest L. Patten, New Haven, Conn., assignor to The Goodyear's India Rubber Glove Manufacturing Co., Naugatuck, Conn., a corporation of Connecticut Application December 22, 1932, Serial No. 648,403

8 Claims. (Cl. 12—1)

This invention relates to an article assembling conveyer, more particularly to a conveyer for use in the assembling of rubber footwear articles.

For many years in rubber footwear practice, the articles have been assembled individually by the operators on lasts. The various parts of rubber footwear are largely composed of either sheet rubber stock or rubberized fabric, and in the majority of cases the assembling of the parts is accomplished by superposing the parts on the last and relying upon the adhesiveness of the raw rubber to unite the parts until they have been finally united by the vulcanizing process. This individual assembling requires a large outlay of space and of equipment such as trucks, racks, tools, and fabric leaved "books" for holding the tacky rubber parts in spaced relation.

More recently rubber footwear articles have been assembled on conveyers of various types, these conveyers in general consisting of a driven endless chain provided at intervals with carriages guided by rails, each carriage having attached thereto an adjustable support for the footwear last upon which the desired article is to be built. As the lasts are moved along by the conveyer, operators stationed at intervals along the conveyer successively assemble the desired parts on the last so that as each last reaches the final station the desired assembly is completed.

The type of continuous chain conveyer so far used has been one which has two parallel runs which at each end extend around a sprocket, a series of carriages for the last supports being disposed at intervals along the chain. The sprockets are horizontally arranged and turn on vertical axes, and as a result the carriages for the last supports and their guide rails, are vertically disposed with the last supports projecting substantially horizontally. The sprockets have been of large radius so that the two parallel runs of the conveyer are widely spaced apart in a horizontal direction. As a result of this construction the conveyer takes up a large amount of floor space.

In this type of conveyer the assembling takes place along both parallel runs, so that the start and finish of the assembling are at the same end of the conveyer. Where a number of conveyers are in use this causes confusion in supplying parts and removing finished articles, and it requires a large amount of trucking and handling space.

Another difficulty is that during the assembly of the rubber footwear articles, especially articles such as boots which must be assembled on heavy metal lasts, there is considerable leverage exerted by the operators during rolling and pounding operations so that it is difficult with the types of conveyers now in use to support the lasts with the desired rigidity, and also to prevent undue wear on the conveyer structure.

An object of my invention is to provide a strong, rigid conveyer capable of efficiently handling heavy footwear lasts, such as boot trees, during boot manufacturing operations, and which at the same time is equally adaptable for use with lighter lasts for overshoes, etc.

Another object is to increase the strength of the conveyer, while at the same time making it more compact and reducing the floor space occupied.

Still another object is to provide a conveyer in which the lasts will be conveniently presented to the maker during footwear assembly operations, but the conveyer structure and last supports will be entirely out of the way during idle movement.

A further object is to provide an improved carriage for the last supports which will furnish a rigid base for the last support and which will be capable of making sharp turns on the conveyer tracks.

Other objects will appear from the attached specification and drawings, in which latter—

Figure 5 is a broken plan view showing the drive mechanism;

Figure 6 is a broken side view of the drive mechanism;

Figure 7 is an end view of one of the carriages for the last supports;

Figure 8 is a sectional view of one of the carriage trucks on the line A—A of Fig. 7;

Figure 9 is a section on the line B—B of Fig. 7;

Figure 10 is an elevational detail of a stop mechanism for the conveyer; and

Figure 11 is a side elevation of the stop.

Figure 1:
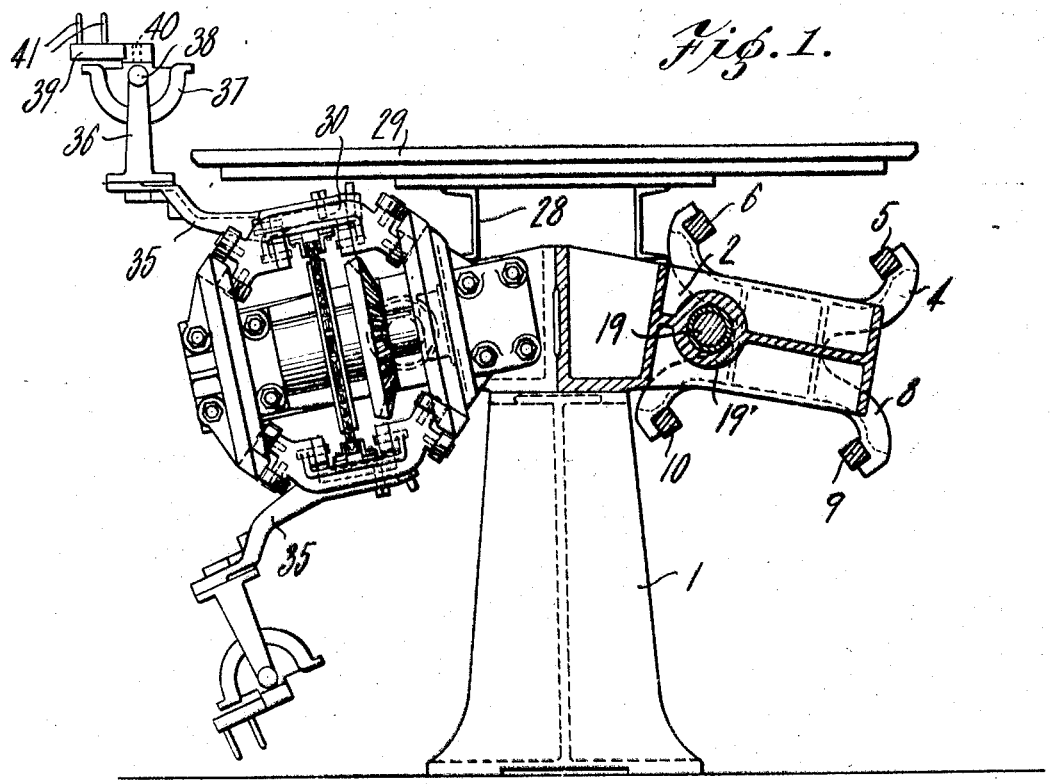
Figure 1 is an end view of the conveyer.

Referring to the drawings, the conveyer is supported by a series of spaced legs 1, each of which carries at its top a transverse arm 2 (Figs. 1, 5 and 6). The construction shown is one in which twin conveyers are used, one being disposed on each side of the center of the legs 1. As the conveyers per se are identical in construction, but one of them will be described.

Secured to each arm 2 on its upper side is a cross arm 3 having at its ends U-shaped yokes 4, the branches of which are upwardly extended. Secured to the outer branches of the yokes 4 are rails 5, in the present instance square in section, while secured to the inner branches of the yokes 4 are similar square rails 6. Other forms of rail than a square section may be used, such as circular. In a similar manner there is secured to the under side of each arm 2 a cross arm 7 having at its ends U-shaped yokes 8 similar to the yokes 4, but in this instance having their branches downwardly directed. Attached to the outer branches of the yokes 8 are square rails 9, and attached to the inner branches are similar square rails 10. It will be noted that the outer rails 5 and 9 are not in the same horizontal planes with the respective inner rails 6 and 10 but are depressed to a considerable extent, the purpose of which will be later explained.

At each end of the upper outer rails 5 they are connected by semi-circular rail elements 11 with the lower outer rails 9, and in a similar manner the upper inner rails 6 are connected at their ends by semi-circular rail elements 12 with the lower inner rails 10. The described construction thus furnishes inner and outer tracks each of which is continuous and has an upper and a lower run.

At a point between the inner and outer tracks an endless conveyer chain 13 is disposed, which chain at each end runs over sprockets 14. Each sprocket 14 is mounted on a hub 15 rotatable on the shaft 16, and each hub 15 is provided with a gear 17 meshing with a gear 18 carried on an end of the drive shaft 19, the shaft 19 being mounted in bearings 19′ carried by the respective arms 2. By this construction the sprocket at each end of the conveyer chain is positively driven. At an intermediate point on the shaft 19, it is driven by a sprocket and chain connection 20 from the short shaft 21, this latter in turn being driven by the sprocket and chain connection 22 from the speed reduction mechanism 23, and the latter through a sprocket and chain connection 24 is driven from a Reeves drive mechanism 25, which latter is driven by a sprocket and chain connection 26 from the motor 27.

The spaced legs 1 are rigidly connected at their tops by the longitudinal beams 28, and upon these beams is mounted a table 29, which not only serves as a resting place for supplies and tools but also completely covers the conveyer mechanism.

Disposed at suitable intervals along the conveyer chain 13 are carriages 30 (Fig. 7), each of which is provided at its front and rear ends with pairs of aligned bearing lugs 31. In each of these pairs of lugs are disposed pivot pins 32 carried by a truck 33, and at its opposite ends the truck is provided with pairs of rollers 34, the rollers of a pair being mounted on axes at right angles to one another so that, as shown in Fig. 7, one roller bears against one inner face of the rail 5 while the cooperating roller bears against the other inner face of rail 5, and in a similar manner the pair of rollers 34 at the opposite end of the truck bear against the inner faces of the rail 6. The truck at the opposite end of the carriage is identical with that described.

Rigidly connected to each carriage 30 is a laterally extending bent arm 35 upon the outer end of which is mounted any suitable form of last support. That illustrated in the present case is similar to the last support described in patent to Patten No. 1,498,400, June 17, 1924 and therefore it will be but briefly described. The last support comprises a main body in the form of Y-shaped member 36 which is rotatably mounted on the end of the arm 35 by the pivot pin 36′, so that the Y-shaped member 36 can rotate on an axis which by reason of the bending of arm 35 is not vertical to the plane of carriage 30 but inclined thereto. A semi-circular segment 37 is mounted for rotation in the arms of the Y-shaped member 36 at the pivot points 38 (Fig. 1), and the last support proper 39 is mounted to rotate in the semi-circular segment 37 on an axis 40 which is vertical to the segment, the lasts being held in position on the support by the last engaging pins 41. By the above described construction, which is explained in detail in the Patten patent, the last may be moved about three different axes, thus facilitating the assembly of parts on the last. The carriage 30 is connected to the conveyer chain 13 through brackets 42 attached to the lower side of the forward truck 33, these brackets being in turn connected to one of the sprocket links.

In order to prevent injury through failure of the operator for any reason to remove a last at the end of the top run of the conveyer, a safety stop is provided adjacent the end. This stop (Fig. 10) consists of a curved contact arm 43 disposed in the path of a last in the manner shown in Fig. 10. This arm is pivotally mounted at 44 on a switch contact arm 45 which in turn is pivotally mounted on the frame of the conveyer. An adjustable contact pin 47 is mounted in one end of contact arm 45 in position to contact with a push button switch 48, which latter through cable 49 is in the electric circuit of drive motor 27. The last contact arm 43 is resiliently held by the spring 50 attached thereto and to the conveyer frame, and the switch contact arm 45 is resiliently held by the spring 51 attached thereto and to the last-contact arm 43. It will be seen that if an operator fails to remove a last, it strikes the last contact arm 43 and moves said arm and the switch contact arm 45 as a unit until pin 47 has depressed push button 48 and stopped the motor, after which any slight further movement of the conveyer merely causes the arm 43 alone to move, due to the spring 51 on the switch contact arm 45.

*Operation*

In operation the carriages 30 are moved along beneath the table 29 and the lasts carried by the last supports on the upper run of the conveyer are presented in turn to the operators stationed along the conveyer. These operators successively assemble the parts of a rubber footwear article on each last, this assembling operation being facilitated by the universal movements of which the last support is capable, since these movements permit any desired portion of the last to be presented to the operator for the application of a part. The final operator in the line removes the last and article for any subsequent treatment.

By reason of the disposal of the outer rails 5 and 9 in lower planes than the respective inner rails 6 and 10, an advantageous operation of the conveyer is secured. In the first place, the conveyer structure as a whole is tilted downwardly so that it is entirely confined within the area beneath the table 29, with the exception of the outwardly projecting last supports. Hence the supporting arms 35 for the last supports can be made short and rigid and yet the operators can work very close to the last supports and assemble the footwear articles with the greatest convenience. At the same time by reason of their being able to stand close to the last support they can more readily reach tools and parts disposed on the table 29.

It will be noted (Fig. 1) that while the conveyer structure and its carriages are downwardly tilted, the arms 35 are so disposed that the Y-shaped members of the last supports are not vertical to the plane of their carriages but inclined thereto. As a result, on the upper run of the conveyer the inclination of the carriage and the inclination of the Y-shaped members neutralize each other so that the last support as a whole is in a convenient vertical position. On the lower run of the conveyer the two inclinations are added together so that the last supports as a whole are sharply inclined inwardly instead of projecting vertically downward. They are therefore entirely out of the way of the operators so that the latter, as before stated, can stand close to their work without necessitating undue length of the arm 35. The nearer the entire last support structure can be disposed to its carriage 30, the more rigid the construction under the pounding and rolling which are necessary in assembling the footwear parts.

The described construction also enables the conveyer structure as a whole to be made lower in spite of its superposed runs, so that the article supports can be presented at a convenient height to the operators. This reduced height is effected first by the inward inclination of the last supports on their lower run, since by reference to Fig. 1 it will be seen that this inward inclination allows them to be moved in a lower path than if they were disposed vertically.

Figure 2:
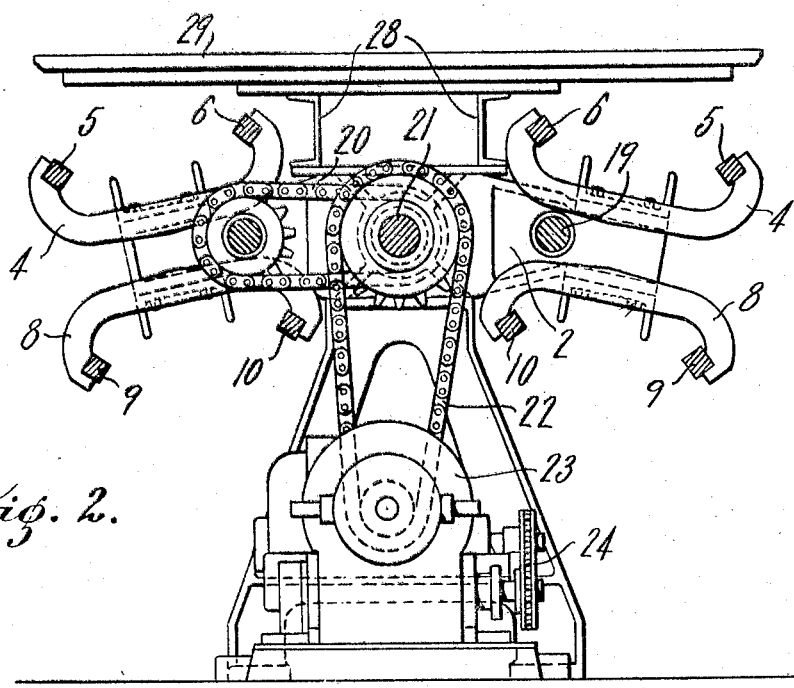
Figure 2 is a transverse section of the conveyer at an intermediate point.
Figure 3:
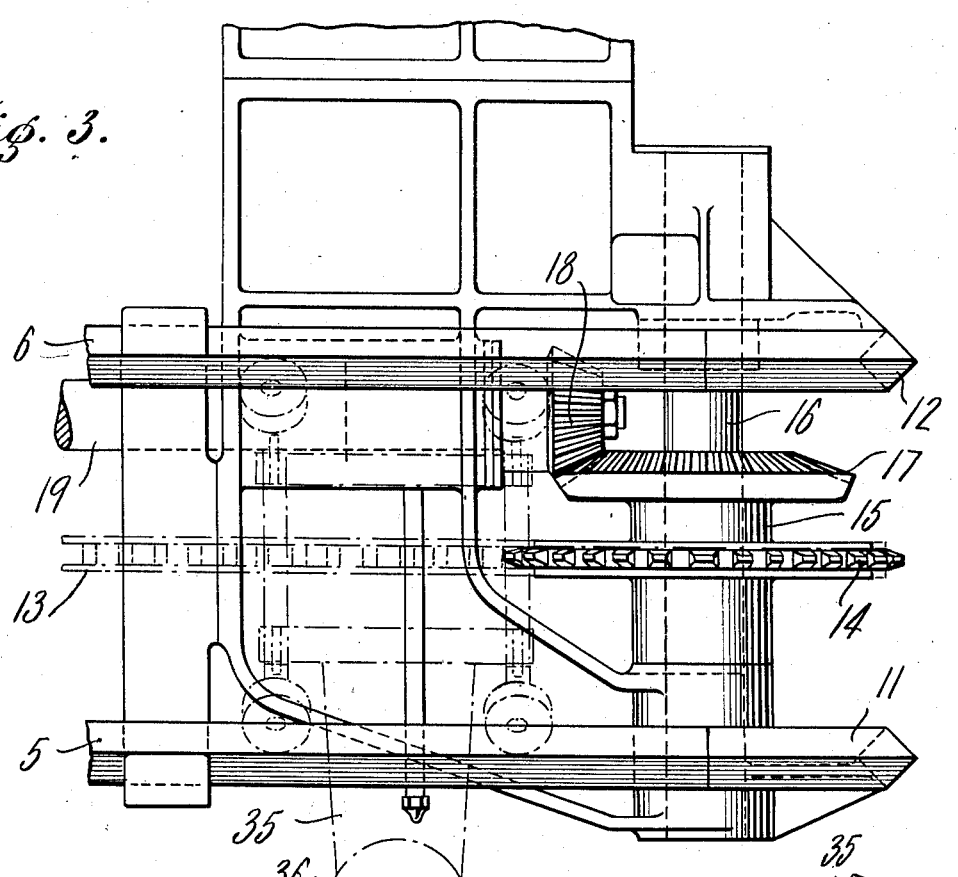
Figure 3 is a top plan view of one end of the conveyer.

It will also be noted by reference to Figs. 1 and 2 that the upper and lower runs of the conveyer are closely spaced in spite of the heavy construction, so that the upper and lower runs of the continuous inner and outer tracks are connected by short radius curves at their ends 11 and 12. This close spacing of the upper and lower runs permits further reduction in overall height.

Figure 4:
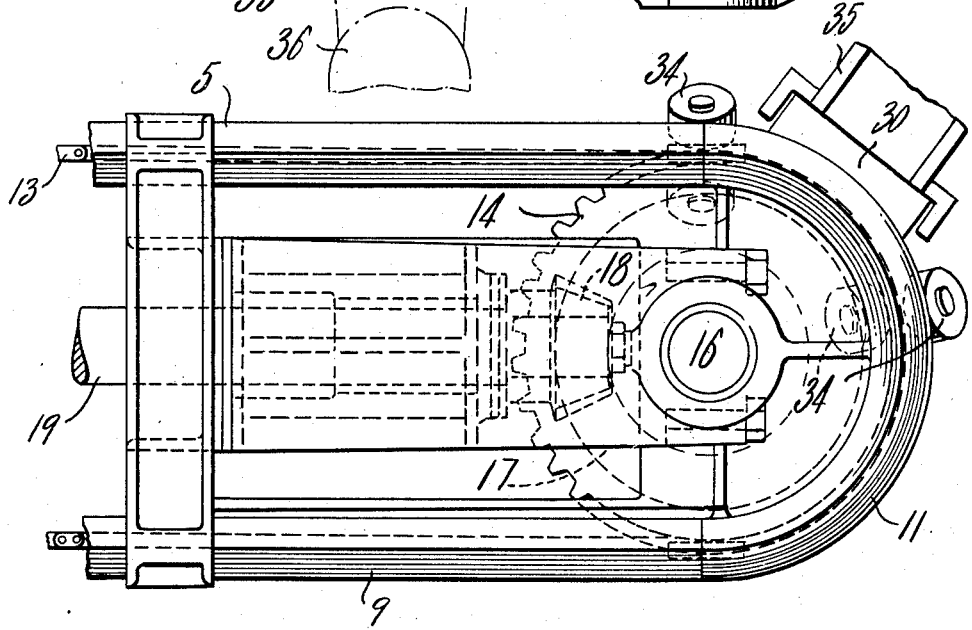
Figure 4 is a side view of the same.

The carriage construction shown in Fig. 7 is particularly adapted for the track construction just described, since by reason of the fact that the carriage rollers are not carried directly by the carriage but on the pivotally mounted forward and rearward trucks, it is possible to smoothly guide the relatively large and heavy carriages around a very short radius of curvature such as that shown in Fig. 4. The double roller engagement of each end of a truck with each rail eliminates all play and keeps the last supports rigid in use.

As before stated, in previous types of footwear conveyers the practice has been to have the two runs of the conveyer widely spaced in the same horizontal plane and running at their ends around sprockets on vertical axes, with the carriages vertically arranged. This construction takes up a large amount of floor space, and by applicant's present construction, two conveyers may be disposed in practically the same floor space as one conveyer of the older type. Since in the average rubber footwear factory an inordinate amount of space is required for trucks, racks, conveyers and various handling and packaging devices, due to the tacky and delicate nature of the rubber parts used, it is essential to cut down floor space in every other way possible, and the present conveyer construction, as before stated, enables two conveyers to be disposed in the space formerly occupied by one.

In addition, due to the before stated large amount of trucking and other equipment which is essential in rubber manufacture, it is desirable in general to use conveyers as straight line units, since this permits a series of twin conveyers, such as illustrated, to be disposed side by side, and it enables all raw material to be delivered at one end with a minimum space requirement for trucks, etc., while all finished goods can be handled at the opposite end with a corresponding further reduction in trucking requirements and space. With the previously used conveyers it was impossible to avoid the confusion and the space requirement necessitated by delivery of parts and removal of finished articles at the same end of the conveyer.

While a specific embodiment of the invention has been shown and described, it is obvious that it is capable of numerous modifications and it is not desired to limit the invention otherwise than as set forth in the appended claims.

Having thus described my invention, what I claim and desire to protect by Letters Patent is:

1. A continuous conveyer having upper and lower runs, a series of carriages connected thereto, article supports on said carriages, guide rollers on said carriages, and inner and outer continuous guide rails cooperating with said rollers, the outer guide rail on each run being in a lower plane than the corresponding inner rail.

2. A continuous conveyer having upper and lower runs, a series of carriages connected thereto, article supports on said carriages and projecting laterally outward therefrom, guide rollers on said carriages, and inner and outer continuous guide rails cooperating with said rollers, the outer guide rail on each run being in a lower plane than the corresponding inner rail, whereby on the upper run the article supports are disposed without the vertical confines of the conveyer and on the lower run the supports are disposed within the vertical confines of the conveyer.

3. A conveyer structure comprising a series of spaced supporting legs, means for connecting them, cross arms extending laterally to each side, pairs of continuous guide tracks connected to said cross arms, one pair at each side of said legs, the outer track of each pair being disposed below the plane of the inner track, a series of carriages movable on each pair of tracks, means for moving them, and article supports connected to said carriages and projecting laterally outward therefrom.

4. A conveyer structure comprising a frame, an endless conveyer carried thereby and having upper and lower runs, the lower run being laterally displaced inwardly from the upper run, carriages disposed at intervals on the conveyer, article supports on said carriages and projecting laterally outward therefrom, and means for driving the conveyer.

5. A conveyer structure comprising a frame, an endless conveyer carried thereby and having upper and lower runs including inner and outer guide rails, the outer rail on both runs being at a lower level than the corresponding inner rail, and the rails of the lower run laterally displaced inwardly with respect to those of the upper run, carriages movable on said rails, article supports on said carriages and projecting laterally outward therefrom, and means for driving the conveyer.

6. A conveyer structure comprising a frame, an endless conveyer thereon having upper and lower runs, the paths of which are laterally inclined downwardly and outwardly, carriages on said conveyer, article supports projecting laterally from said carriages, and means for driving the conveyer.

7. A conveyer having inner and outer continuous guide tracks, the upper and lower runs of each track being relatively closely spaced and connected at each end by semi-circularly curved track elements of relatively short radius, a series of carriages movable on said tracks, said carriages being provided with spaced trucks pivotally connected thereto, each truck having pairs of rollers having interlocking engagement with said tracks, an article support mounted on each carriage, and means for driving the carriages in unison.

8. A rubber footwear making conveyer having inner and outer continuous guide tracks, the upper and lower runs of each track being relatively closely spaced and connected at each end by semi-circularly curved track elements of relatively short radius, a series of carriages movable on said tracks, said carriages being provided at their front and rear ends with longitudinally offset trucks pivotally connected to the carriages, pairs of rollers at each side of each truck having interlocking rolling engagement with a corresponding track, a last support mounted on each carriage, and means for driving the carriages.

ERNEST L. PATTEN.